United States Patent [19]

MacManus

[11] Patent Number: 5,046,154

[45] Date of Patent: Sep. 3, 1991

[54] ENCAPSULATED ARMATURE AND SHAFT ASSEMBLY

[75] Inventor: Daniel C. MacManus, Owosso, Mich.

[73] Assignee: Delco Electronics Corporation, Kokomo, Ind.

[21] Appl. No.: 594,470

[22] Filed: Oct. 9, 1990

[51] Int. Cl.⁵ .............................................. G01R 1/20
[52] U.S. Cl. ......................................... 324/146; 310/51; 310/90; 310/156; 29/607
[58] Field of Search ............... 310/261, 86, 156, 43, 310/49 R, 181, 88, 105, 51, 80, 157, 42, 89; 324/144, 146, 151 A, 207.16, 174; 335/272; 29/607

[56] References Cited

U.S. PATENT DOCUMENTS

| | | | |
|---|---|---|---|
| 3,286,109 | 11/1966 | Madsen | 310/51 |
| 3,487,457 | 12/1969 | Drouard | 310/90 |
| 3,733,504 | 5/1973 | Dennis | 310/86 |
| 3,911,300 | 10/1975 | Lebkuchner | 310/86 |
| 4,404,483 | 9/1983 | Lebkuchner | 310/42 |
| 4,482,829 | 11/1984 | Tardieu et al. | 310/105 |
| 4,507,634 | 3/1985 | Vanderlaan | 335/272 |
| 4,646,007 | 2/1987 | Faria | 324/146 |
| 4,724,601 | 2/1988 | MacManus et al. | 29/602 |
| 4,745,813 | 5/1988 | MacManus | 324/154 PB |
| 4,816,707 | 3/1989 | Wanderlaan | 335/272 |
| 4,890,027 | 12/1989 | Bohner | 310/90 |
| 4,899,432 | 2/1990 | Adam | 310/90 |
| 4,970,423 | 11/1990 | Tamae | 310/49 R |
| 4,982,125 | 1/1991 | Shirakawa | 310/88 |

OTHER PUBLICATIONS

The American Heritage Dictionary; Second College Edition; pp. 1 & 754; 1985.

Primary Examiner—R. Skudy
Attorney, Agent, or Firm—Anthony L. Simon

[57] ABSTRACT

An armature and shaft assembly useful in gauges and stepper motors is encapsulated for ease in manufacture and diversity of application, the capsule being suitable for sealing in dampening fluids and for allowing magnetization of the armature after assembly of the capsule, providing protection against contamination by dust, etc.

7 Claims, 1 Drawing Sheet

ENCAPSULATED ARMATURE AND SHAFT ASSEMBLY

This invention relates to electric gauges and stepper motors and more particularly to providing an improved encapsulated armature and shaft assembly for electric gauges and motors.

BACKGROUND OF THE INVENTION

It is commonplace in automotive vehicle instrumentation to use electric gages driving pointers mounted on the ends of gauge shafts to indicate measure of various vehicle parameters such as vehicle speed or engine RPMs. A common type of gauge has a plastic bobbin supporting an outer winding and a permanent magnet armature on a spindle within a cavity defined by the bobbin. Often a dampening fluid is placed within the cavity to prevent erratic pointer movement caused by fluctuations in the signal driving the gauge.

A characteristic of these previous types of gauges is the difficulty of creating a leak resistant seal for the cavity within which the dampening fluid and the armature are placed. A leak problem can cause a high scrap rate of gauges. Also, because the coils are crosswound on the bobbins, the flexibility of coil designs for the gauges is limited.

Another characteristic of the previous gauges is that when the armature is manufactured, often it is at first not a magnet, but a material such as a polymer bonded ferrite or any equivalent material which can be magnetized through application of a strong magnetic field to become a permanent magnet. In these cases, the magnetizing process must take place some time during the construction of the gauge. Because the magnetizing fixture cannot get close enough to the armature once the armature is inserted in the bobbin, it is difficult to magnetize the armature after insertion into the bobbin. Consequently, magnetization of the armature is usually done before insertion into the bobbin. The difficulty with this method of manufacture is that the armature is subject to attraction of dust and dirt during and after the magnetization process. These impurities are an additional contributing factor to the scrap rate of gauges.

SUMMARY OF THE PRESENT INVENTION

The present invention is an improved encapsulated armature assembly useful in gauges and stepper motors which overcomes many of the limitations of previous gauges. The capsule design provides a more leak resistant cavity for gauge dampening fluid and is characterized by a small magnetic air gap between the armature and the outside of the capsule. This small air gap allows the armature to be assembled within the capsule before it is magnetized and to be later magnetized once it is within the capsule or even within the final gauge assembly.

This invention is suitable for implementation into various types of gauges For example the capsule may be subassembled and then placed within a crosswound bobbin and operated similar to previous gauges mentioned above. Or the capsule may be placed in proximity to various windings on separate coil forms and operated in response to magnetic fields created by those windings.

Structurally the improved encapsulated armature and shaft assembly comprises a shaft upon which is mounted an armature portion made out of material capable of being magnetically charged to form a permanent magnet. A first bearing is placed in the capsule shell which defines a cavity with a closed end and an open end. The first bearing is placed in the closed end. One end of the shaft is placed in the first bearing and a second bearing within which the shaft rotates is mounted in the open end of the capsule shell, forming a leak resistant seal with the shell. The armature portion of the shaft is within the capsule between the two bearings. The capsule shell is magnetically permeable and the magnetic air gap between the outer surface of the capsule shell (which is considered part of the magnetic air gap) and the armature is small such that the armature portion of the shaft may be magnetized by a charging magnetic field imposed on the capsule from outside the capsule.

Various other improvements and modifications to the present invention are set forth in the detailed description below.

DETAILED DESCRIPTION OF THE INVENTION

Figure 1:
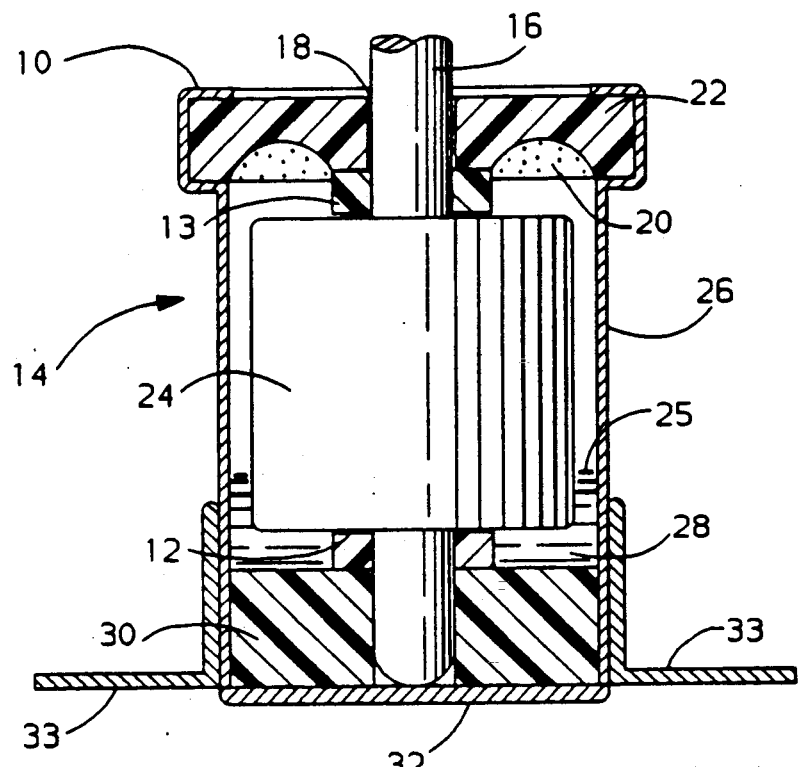
FIG. 1 is a cutaway view showing the structure of the preferred implementation of this invention.

Referring to FIG. 1, reference numeral 14 generally designates the preferred encapsulated armature and shaft assembly which includes the outer shell 26, the shaft 16 containing armature 24, and first and second bearings 30 and 22. The invention can be implemented into a wide variety of gauges ranging in sizes but is particularly well suited for miniature gauge applications as the width of the encapsulated armature and shaft assembly 14 may be in the range of 0.25 inches or smaller.

The outer shell 26 is manufactured from copper, aluminum or any other suitable magnetic permeable material and may be extruded from a cylindrical blank through a proper form or manufactured through any other suitable technique. As can be seen the outer shell 26 is closed at the end 32 near bearing 30 and opened at the end near bearing 22. Because of the magnetic permeability of the outer shell 26, the outer shell 26 is considered part of the air gap between armature 24 and any magnetic field generator (such as coils 40 in FIG. 2) outside of shell 26.

In the manufacture of the encapsulated armature and shaft assembly 14, the bearing 30 is placed in the bottom of the shell 26. The bearing 30 may be plastic and may be press fit into the outer shell 26. In the example shown, a separate spacer 12 is placed between the bearing 30 and the armature 24. In actual practice, this spacer is not necessary or may be molded out of bearing 30 if desired. Next the shaft 16 with the armature 24 is inserted in the bearing 30. The closed end 32 of the outer shell 26 acts as a stop to keep the shaft 16 in the proper position in the direction of the bearing 22.

The armature 24 is a preferably a material which may be charged into a permanent magnet, such as a polymer bonded ferrite, glass ferrite, Alnico ™, any other equivalent material, and forms a cylinder around the shaft 16. In order to prevent contamination from different forms of dust and dirt, it is preferable that the armature 24 not be magnetized before insertion into the encapsulated armature and shaft assembly 14. Another spacer 13 is placed above the armature 24 as shown and bearing 22 is placed in the open end of the outer shell 26 which is widened as shown.

The ends of the outer shell are crimped around the bearing 22 as shown to seal the capsule. In many cases it is desired to have dampening fluid 25 within the capsule to prevent erratic pointer movements with slight variations in signal to the gauge in which the encapsulated armature and shaft assembly 14 might be used. In these cases, a small amount of dampening fluid is placed in the cavity 28 before the second bearing 22 is sealed into the assembly. The viscosity of the dampening fluid may vary with the particular gauge application. A small amount of fluid is usually required to dampen the gauge so the majority of cavity 28 is usually filled with air.

The crimp 10 of the outer shell around the outer bearing 22 provides a leak resistant seal to keep the dampening fluid within the cavity 28. The gap 18 between the shaft 16 and the bearing 22 is preferably on the order of two thousandths (0.002) inches and is also leak resistant. To discourage the dampening fluid from leaking out of the gap 18 a channel 20 is preferably placed in the bearing 22. This channel tends to trap any dampening fluid and prevent leakage in event that the encapsulated armature and shaft assembly 14 is oriented so that the dampening fluid tends to flow toward the gap 18.

Once the second bearing 22 is sealed into place, the capsule is a complete unit ready for use in a variety of applications. It is at this time that it may be desirable to magnetize the armature 24. This is done by simply applying a strong magnetic field across the encapsulated armature and shaft assembly 14 and armature 24 perpendicular to the axis of shaft 16 and maintaining the field for several seconds. This process of magnetization of polymer bonded ferrites and equivalent materials is well known to those skilled in the art.

Figure 2:
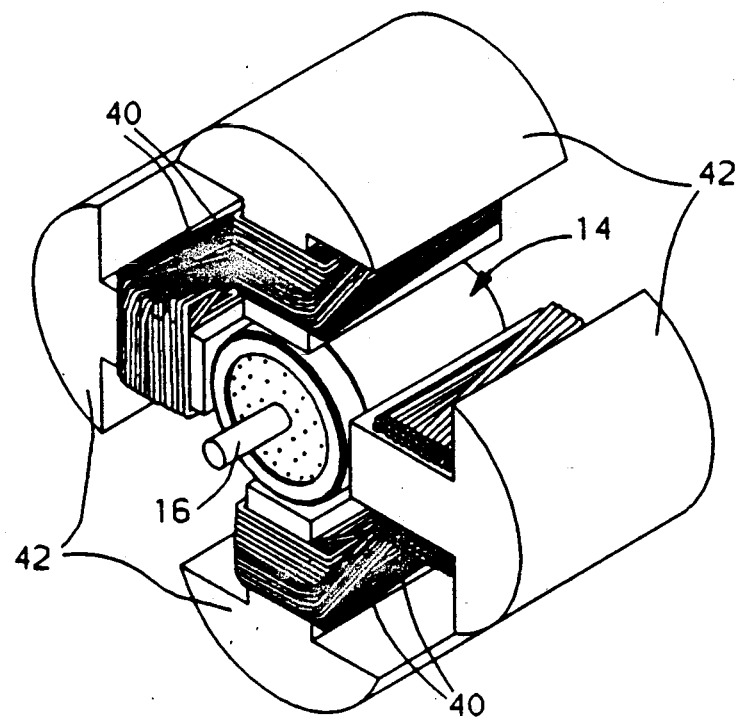
FIG. 2 is a schematic diagram showing the encapsulated armature assembly in proximity to four coils which may be used as a gauge or a stepper motor.

FIG. 2 is one example of a wide variety of implementations in which the present invention is well suited. Reference numeral 42 generally designates four coil forms which may be plastic or metal and are mounted so as to be stationary. Each coil form is wound with electrical wiring to form coils 40 which, when flowing with electrical current, create magnetic fields which flow through the outer shell of the encapsulated armature and shaft assembly 14. The shell 26 (FIG. 1) of the capsule 14 is non-rotatably mounted as by tabs 33 (FIG. 1) attached to the outer shell 26 and a support for the encapsulated armature and shaft assembly 14 (support not shown). The magnetic fields created by the coils 40 act on the armature 24 (FIG. 1) to rotate the shaft 16.

As an example of the diversity of uses of the present invention, the apparatus shown in FIG. 2 can be operated either as an air core gauge or a stepper motor. To operate the apparatus as an air core gauge, each coil 40 is connected in series with the coil 40 opposite the encapsulated armature and shaft assembly 14 and, when current is applied generates a magnetic field in the same direction as the coil 40 opposite the capsule. The circuit can then be driven in the manner of conventional air core gauges with two coils. In this instance a pointer would be attached to the end of shaft 16 and the unit could be used in a variety of gauge applications.

Alternatively the coils may be driven in phases for operating the apparatus as a stepper motor. One skilled in the art would easily be able to implement the structure shown in FIG. 2 as a stepper motor or as a gauge suitable for automotive instrumentation.

As is obvious to those skilled in the art, this invention is not limited to the above described examples but includes a wide variety of implementations of the capsule assembly. For example the bearing 30 may be molded to include a stop for the shaft 16 so that the shaft doesn't stop against the closed end 32 of the outer shell 26 but against the stop molded into the bearing 30. Additionally a wide variety of coil combinations using one or more coils may be used to rotate the armature 24 and shaft 16, including conventional crosswindings. If the invention is used in a gauge, return springs or weighted pointers may be used to return the gauge to zero. Any of these above implementations and many more may be easily implemented by those skilled in the art. Many of the modifications and improvements to the present invention which may occur to those skilled in the art may fall within the scope of the invention as set forth below.

The embodiments of the invention in which an exclusive property or privilege is claimed are defined as follows:

1. An improved encapsulated armature and shaft assembly comprising:
   a shaft with an armature capable of being magnetically charged to form a permanent magnet mounted thereon near one end of the shaft;
   a first bearing surrounding said one end of the shaft within which the shaft can rotate;
   a second bearing, surrounding a portion of the shaft opposite the armature from said one end, within which the shaft can rotate;
   an outer shell constructed of magnetically permeable material defining a cylindrical cavity with a closed end and an open end, the first bearing mounted within the cavity at the closed end, the open end sealed around the second bearing, holding the second bearing in the open end and forming a substantially fluid impermeable capsule, the shaft mounted in the bearings so that the armature is freely rotatable within the cavity in response to fluctuating magnetic fields applied to the capsule, the outer shell having an outer surface being within a distance of the armature allowing the armature to be charged to become the permanent magnet while it is within the capsule from a strong magnetic field created outside of the capsule.

2. The improvement in claim 1 also comprising a dampening fluid within the encapsulated assembly, and wherein the second bearing forms a leak resistant seal between the second bearing and the shaft and includes a surface facing the first bearing, the surface defining a channel for retaining the dampening fluid minimizing leakage of the dampening fluid between the shaft and the second bearing.

3. The improvement in claim 1 wherein the magnetically permeable material is aluminum.

4. The improvement in claim 1 wherein the encapsulated assembly is mounted in proximity to at least one coil capable of creating a magnetic field when electric current flows through the coil whereby the shaft rotates in response to change in the magnetic field.

5. The improvement in claim 1 also comprising first and second spacers between the first bearing and the armature and the second bearing and the armature.

6. An improved encapsulated armature and shaft assembly comprising:
   a shaft with an armature capable of being magnetically charged to form a permanent magnet mounted thereon near one end of the shaft;

a first bearing surrounding said one end of the shaft within which the shaft can rotate;

a second bearing, surrounding a portion of the shaft opposite the armature from said one end, forming a leak resistant seal between the bearing and the shaft within which the shaft can rotate and including a surface which defines a channel;

an outer shell constructed of magnetically permeable material defining a cylindrical cavity with a closed end and an open end, the first bearing mounted within the cavity at the closed end, the open end sealed around the second bearing, holding the second bearing in the open end and forming a substantially fluid impermeable capsule, the channel of the second bearing facing within the capsule, the shaft mounted in the bearings so that the armature is freely rotatable within the cavity in response to fluctuating magnetic fields applied to the capsule, the outer shell having an outer surface being within a distance of said armature allowing the armature to be charged to become the permanent magnet while it is within the capsule from a strong magnetic field created outside of the capsule;

first and second spacers between the first bearing and the armature and the second bearing and the armature; and a dampening fluid within the encapsulated armature and shaft assembly which is retained within the capsule in part by the channel in the second bearing;

wherein the encapsulated armature and shaft assembly is mounted in proximity to at least one coil capable of creating a magnetic field when electric current flows through the coil whereby the shaft rotates in response to change in the magnetic field.

7. The improvement in claim 6 wherein the magnetically permeable material is aluminum.

* * * * *